(12) United States Patent
Yamamoto et al.

(10) Patent No.: US 6,680,901 B1
(45) Date of Patent: Jan. 20, 2004

(54) OFDM DEMODULATOR

(75) Inventors: Takeshi Yamamoto, Tokyo (JP);
Kazuhiro Okanoue, Tokyo (JP);
Tomoki Osawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/534,535

(22) Filed: Mar. 27, 2000

(30) Foreign Application Priority Data

Mar. 26, 1999 (JP) .............................. 11-084560

(51) Int. Cl.[7] .............................................. H04J 11/00
(52) U.S. Cl. ....................... 370/208; 370/210; 370/344; 370/503; 375/260
(58) Field of Search ................................ 370/203, 204, 370/208, 210; 375/260

(56) References Cited

U.S. PATENT DOCUMENTS 5,682,376 A * 10/1997 Hayashino et al. ......... 370/206
5,802,117 A * 9/1998 Ghosh ........................ 375/344
6,175,550 B1 * 1/2001 van Nee ..................... 370/206
6,219,334 B1 * 4/2001 Sato et al. .................. 370/210

OTHER PUBLICATIONS

F. Daffara et al., "A New Frequency Detector for Orthogonal Multicarrier Transmission Techniques", IEEE (1995), pp. 804–809 with Abstract.

* cited by examiner

Primary Examiner—Ricky Ngo
Assistant Examiner—Christopher M Swickhamer
(74) Attorney, Agent, or Firm—Sughrue Mion, PLLC

(57) ABSTRACT

In order to shorten delay time in a synchronization circuit in an OFDM demodulator, with respect to a preamble for estimating carrier frequency/channel characteristic, the synchronization circuit does not have a delay circuit and a frequency error compensation signal of a carrier frequency estimating circuit is supplied to a channel distortion estimating circuit connected to an output of an FFT. In the channel distortion estimating circuit, a carrier frequency deviation is compensated.

3 Claims, 7 Drawing Sheets

OFDM DEMODULATOR

BACKGROUND OF THE INVENTION

The present invention relates to an OFDM (Orthogonal Frequency Division Multiplexing) demodulator of a burst signal transfer system using an OFDM modulating method and, more particularly, to an OFDM demodulator in which a processing delay of a synchronization circuit can be shortened.

An OFDM modulating method as a modulating method promising for a high-speed data transfer such as a high-speed wireless LAN has been being examined. A conventional OFDM demodulator for receiving an OFDM modulated signal will be described by referring to drawings.

FIG. 4 is a block diagram showing the configuration of a conventional OFDM demodulator. FIG. 5 is a diagram showing a format of an OFDM burst signal.

As shown in FIG. 5, at the head of each burst data 23, a preamble 21 for symbol synchronization and a preamble 22 for estimating a carrier frequency and a channel characteristic are provided.

In FIG. 4, an OFDM burst signal is received by an antenna 1. An orthogonal component detector 2 performs quasi-synchronous detection (QUASI-SYNC) on the received signal by using a local signal having a frequency which is very close to a carrier frequency to thereby obtain an analog complex baseband signal.

A/D converters 3 and 4 sample and quantize an analog complex baseband signal of an orthogonal component and an in-phase component outputted from the orthogonal component detector 2.

A synchronization circuit 10 receives a digital complex baseband signal sampled and quantized by the A/D converters 3 and 4 and performs a synchronizing operation.

FIG. 6 is a block diagram showing the synchronization circuit 10. In FIG. 6, a symbol timing estimating circuit 14 which receives the digital complex baseband signal establishes symbol synchronization by the digital complex baseband signal sampled and quantized which is outputted from the A/D converters 3 and 4 at the time of receiving the preamble 21 for symbol synchronization shown in FIG. 5.

The symbol timing estimating circuit 14 outputs a symbol timing to a carrier frequency estimating circuit 11 and a symbol synchronization processing circuit 13.

On receipt of the preamble 22 for estimating the carrier frequency and channel characteristic having repetitive patterns, the carrier frequency estimating circuit 11 detects phase rotation in the same patterns which periodically appears, estimates a carrier frequency error, and outputs a frequency error compensating signal to a complex multiplier 12. A specific configuration of a carrier frequency estimating circuit is described in, for example, F. Daffara and O. Adami, "A new frequency detector for orthogonal multicarrier transmission techniques" Proc. of VTC' 95, pp 804–809.

A delay circuit 15 receives the digital complex baseband signal, delays the signal by predetermined time (which is about time of the preamble 22 for estimating the carrier frequency and channel characteristic) and, supplies the resultant signal to the complex multiplier 12.

The complex multiplier 12 complex-multiplies the frequency error compensated signal by the output of the delay circuit 15, thereby compensating a frequency deviation of the carrier wave.

After establishing symbol synchronization with the output of the complex multiplier 12 by the symbol synchronization processing circuit 13, the preamble 22 for estimating the carrier frequency/channel characteristic is outputted from the synchronization circuit 10.

A fast Fourier transform (FFT) circuit 6 in FIG. 4 Fourier transforms an output signal of a synchronization circuit 5 and divides the OFDM modulated signal into signals of subcarriers.

On receipt of the preamble 22, a channel distortion estimating circuit 16 receives the signals of subcarriers from the FFT circuit 6 and estimates a channel characteristic $H(\omega)$.

The preamble 22 for estimating the carrier frequency/channel characteristic is used to estimate the channel characteristic $H(\omega)$ in the channel distortion estimating circuit 16.

As a result of estimation, the channel distortion estimating circuit 16 outputs a coefficient $1/H(\omega)$ for compensating channel distortion to a channel distortion compensating circuit 8.

The channel distortion compensating circuit 8 receives the signals of respective subcarriers and compensates the channel distortion by complex-multiplying the signal by the coefficient $1/H(\omega)$ for compensating the channel distortion.

FIG. 7 is a block diagram of the channel distortion estimating circuit 16. In the diagram, the preamble signal 22 for estimating the carrier frequency/channel characteristics is supplied to a complex multiplier 161 in the channel distortion estimating circuit 16. The inverse number of the pattern of the preamble signal 22 is stored in a reference signal storing circuit 163 and is supplied to the other input terminal of the complex multiplier 161 in the channel distortion estimating circuit 16. Both input signals are multiplied by each other in the complex multiplier 161 and an estimation result $H(\omega)$ of the channel characteristic is obtained as an output of the complex multiplier 161. The output $H(\omega)$ of the complex multiplier 161 is supplied to an inverse number circuit 162 and a coefficient $1/H(\omega)$ for compensating the channel distortion is computed. The coefficient $1/H(\omega)$ is multiplied by an output of the FFT 6 in the complex multiplier 8, thereby compensating the channel distortion.

A subcarrier demodulating circuit 9 receives the distortion compensating signal and demodulates it every subcarrier.

As described above, the conventional OFDM demodulator has the delay circuit 15 in the synchronization circuit 10 used for compensating the carrier frequency deviation with respect to the preamble for estimating the carrier frequency and channel characteristic.

According to the orthogonal frequency division multiplexing (OFDM) modulating system, data to be transmitted is divided into a plurality of low-speed subcarriers. The period of a symbol is therefore long (generally, about 4 μsec) and delay time in the delay circuit 15 is integer times or the unit of the symbol. In this case, such long delay time in the synchronization circuit 10 denotes an increase in the synchronization processing time on the symbol unit basis.

There is consequently a problem of a low throughput of a whole OFDM communication system due to the delay time in the delay circuit in the synchronization circuit.

SUMMARY OF THE INVENTION

In order to solve the problems, according to the invention, there is provided an orthogonal frequency division multiplexing (OFDM) demodulator for demodulating an OFDM modulated signal, comprising: a quasi-synchronous detector for converting the OFDM modulated signal into a complex baseband signal of two components by quasi-synchronous detection; a synchronization circuit for receiving the complex baseband signal and establishing symbol synchronization; an FFT for Fourier transforming an output of the synchronization circuit into signals of respective subcarriers; a channel distortion estimating circuit for compensating a carrier frequency error on the basis of an output of the FFT and a frequency error compensation signal outputted from the synchronization circuit and estimating channel distortion; a channel distortion compensating circuit for compensating channel distortion in the output of the FFT on the basis of an output of the channel distortion estimating circuit; and a demodulating circuit for demodulating an output of the channel distortion compensating circuit every subcarrier.

Specifically, a frequency error compensation signal is detected by using a preamble signal for estimating carrier frequency/channel characteristic in a carrier frequency estimating circuit in a synchronization circuit having no delay circuit. The frequency error compensation signal is outputted to a complex multiplier in a propagation path distortion estimating circuit. After phase rotation caused by a frequency error is corrected by an output of the complex multiplier, the channel distortion is estimated and compensated. As a result, the carrier frequency deviation is not compensated in the synchronization at the front stage of the FFT but is compensated after the FFT.

BRIEF DESCRIPTION OF THE DRAWINGS

The above and other objects, features and advantages of the present invention will become more apparent from the following detailed description when taken in conjunction with the accompanying drawings wherein.

DESCRIPTION OF THE PREFERRED EMBODIMENT

An embodiment of the invention will be described by using the drawings.

Figure 1:
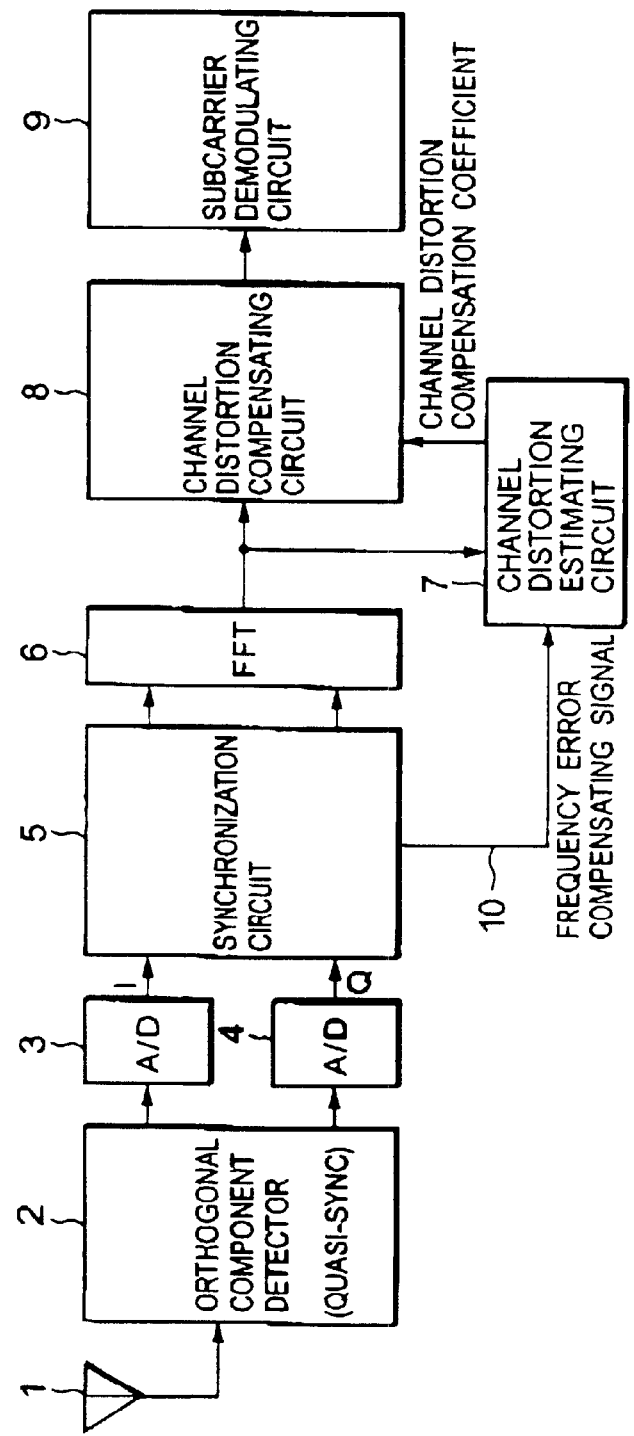
FIG. 1 is a block diagram of an OFDM demodulator of the invention.
Figure 5:
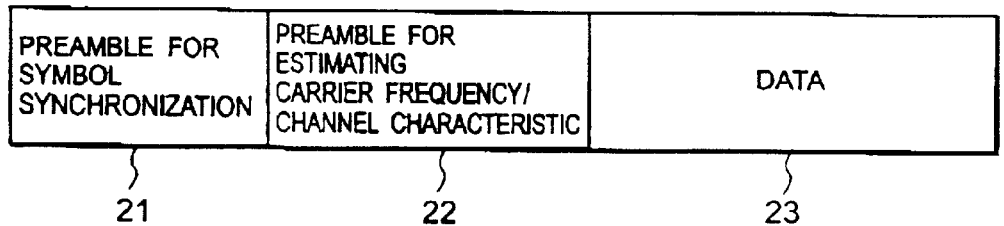
FIG. 5 is a diagram showing a format of an OFDM burst signal.

FIG. 1 is a block diagram showing the configuration of an OFDM demodulator of the invention. The format of an OFDM burst signal is as shown in FIG. 5. In FIG. 1, an OFDM burst signal is received by the antenna 1. The orthogonal component detector 2 converts the reception signal into an analog complex baseband signal by using a local signal of a frequency which is very close to the carrier frequency by quasi-synchronous detection (QUASI-SYNC).

The A/D converters 3 and 4 sample and quantize the analog complex baseband signal of an orthogonal component and an in-phase component outputted from the orthogonal component detector 2.

The synchronization circuit 5 receives a sampled and quantized digital complex baseband signal outputted from the A/D converters 3 and 4 and performs a synchronizing operation.

Figure 2:
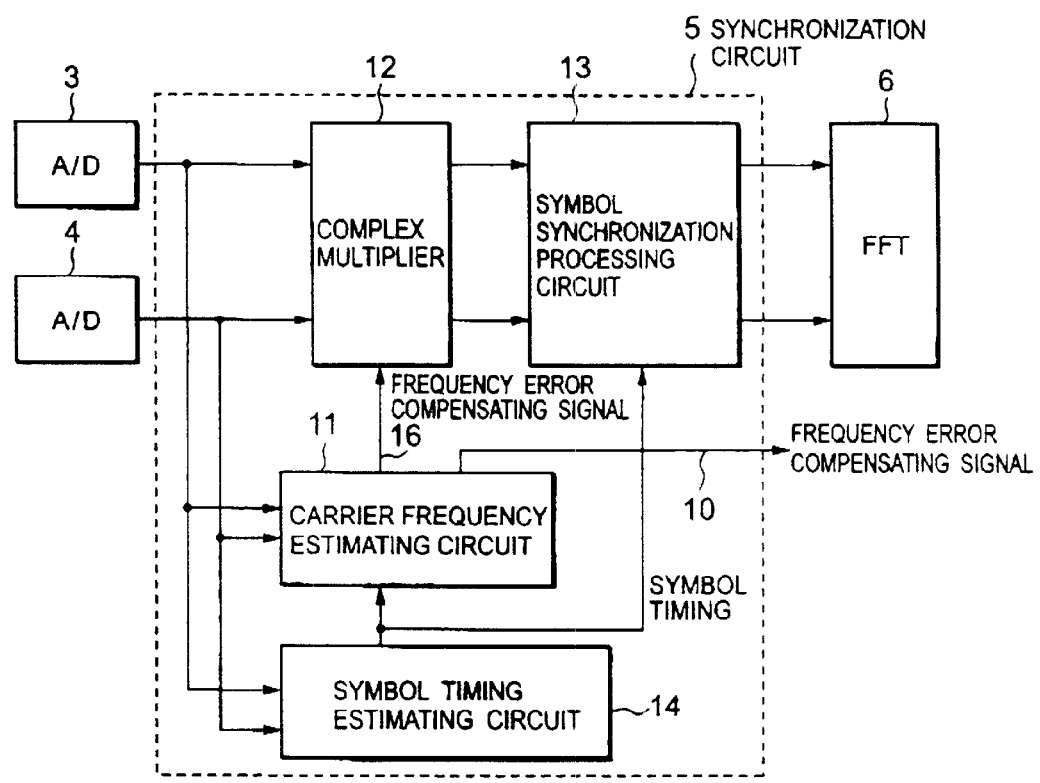
FIG. 2 is a block diagram showing the configuration of a synchronization circuit 5 in FIG. 1.

FIG. 2 shows the configuration of the synchronization circuit 5. In FIG. 2, the symbol timing estimating circuit 14 establishes symbol synchronization by the sampled and quantized digital complex baseband signal outputted from the A/D converters 3 and 4 at the time of receiving the preamble 21 for symbol synchronization.

The symbol timing estimating circuit 14 outputs a symbol timing to the carrier frequency estimating circuit 15 and the symbol synchronization processing circuit 13.

On receipt of the preamble 22 for estimating the carrier frequency and transmission path having repetitive patterns, the carrier frequency estimating circuit 15 detects phase rotation in the same pattern which periodically appears, estimates a carrier frequency error, and outputs it as a frequency error compensating signal 16 to a channel distortion estimating circuit 7. On the other hand, the carrier frequency estimating circuit 15 outputs the result as another output.

Figure 6:
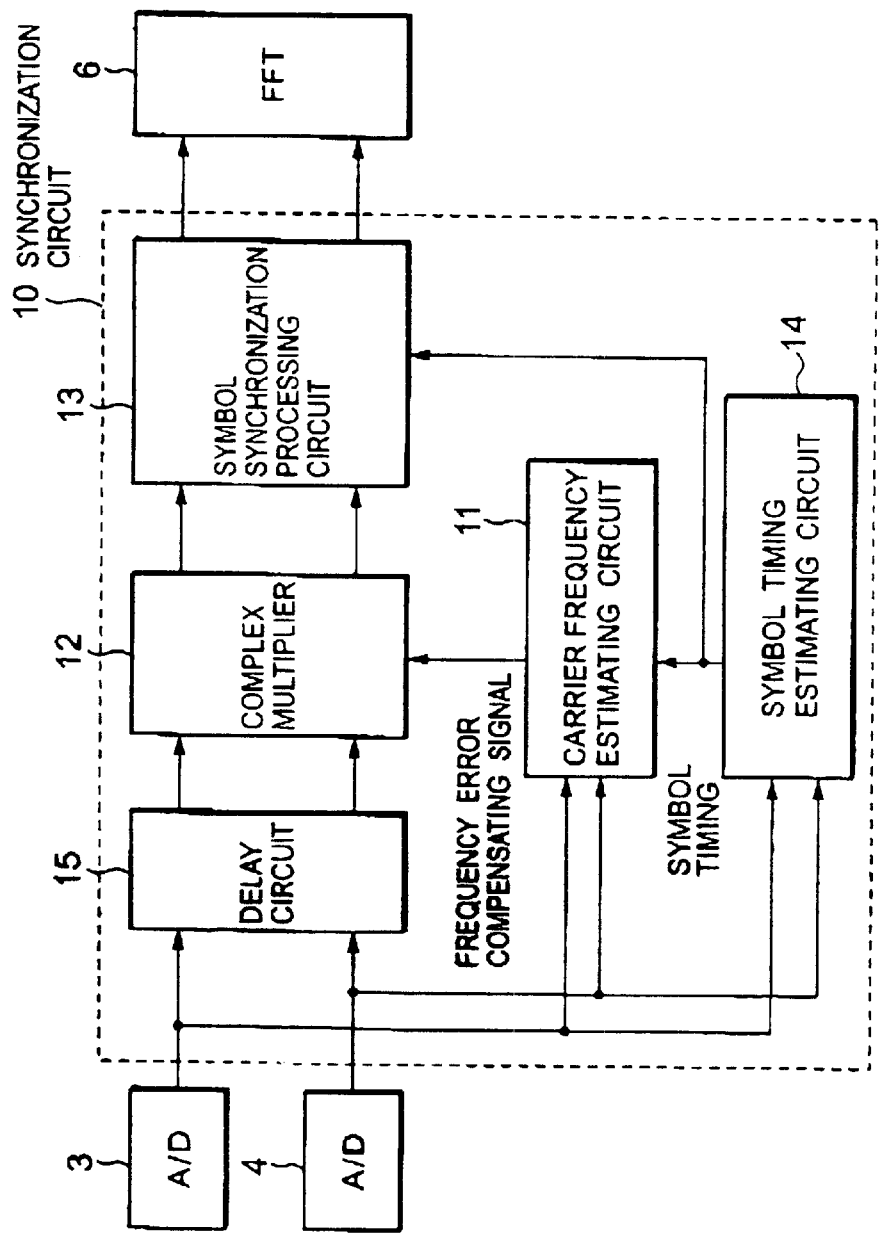
FIG. 6 is a block diagram showing the configuration of a synchronization circuit 5 in FIG. 4.
Figure 7:
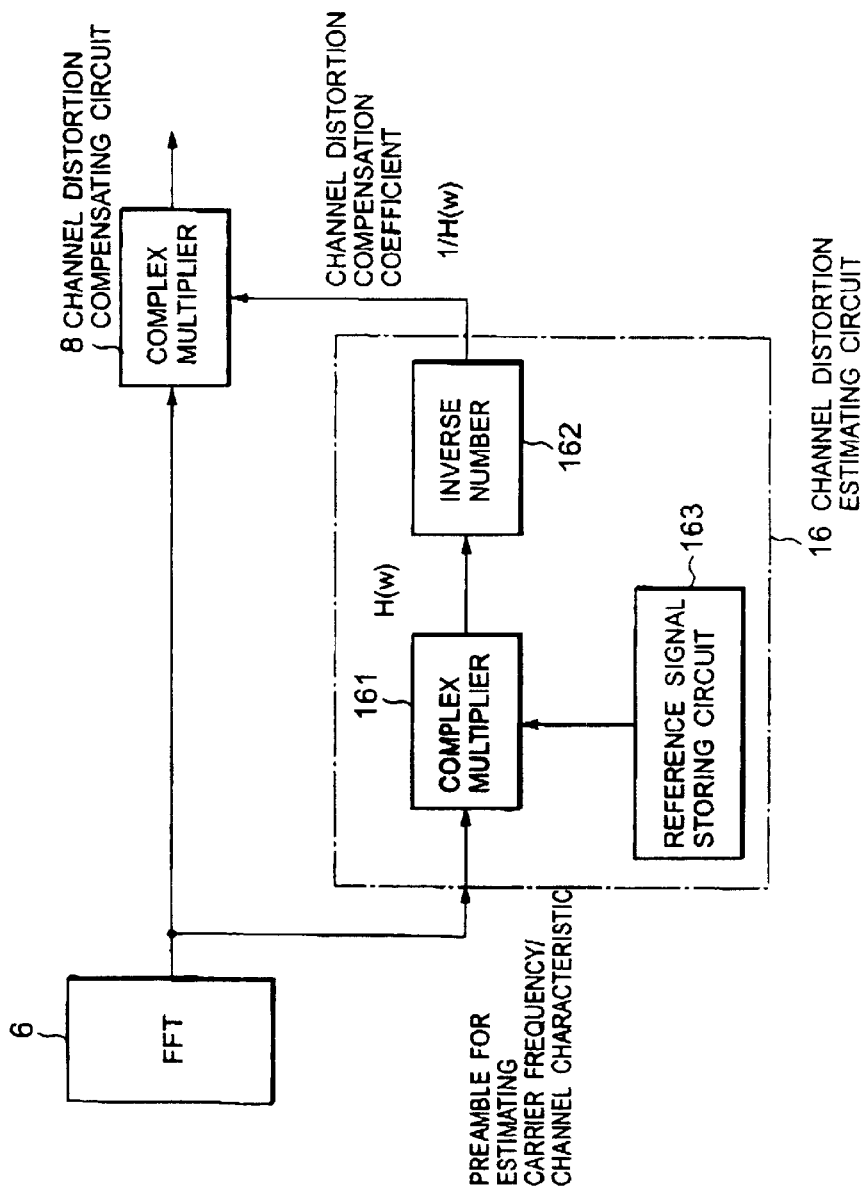
FIG. 7 is a diagram showing the configuration of a channel distortion estimating circuit 16 in FIG. 4.

At this time, in the conventional synchronization circuit 10 shown in FIG. 6, the delay circuit 15 is provided at the front stage of the complex multiplier 12. In the synchronization circuit 5 of the invention, however, since there is no delay circuit at the front stage of the complex multiplier 12, the preamble 22 passes through the complex multiplier 12 before the result of estimation of the carrier frequency is obtained. In the synchronization circuit 5 of the invention, therefore, the frequency is not compensated in the period of the preamble 22.

After establishing the symbol synchronization by the symbol synchronization processing circuit 13, the preamble 22 is outputted from the synchronization circuit 5.

With respect to data 23 after the preambles 21 and 22, the frequency error compensating signal 16 is supplied from the carrier frequency estimating circuit 15 to the complex multiplier 12 where the frequency is compensated. The symbol timing is outputted to the symbol synchronization processing circuit 13 and a symbol synchronizing process is performed.

The fast Fourier transform (FFT) circuit 6 in FIG. 1 performs Fourier transform on the output signal of the synchronization circuit 5 to divide the OFDM modulation signal into signals of subcarriers.

On receipt of the preamble 22, the channel distortion estimating circuit 7 receives the signals of respective subcarriers from the FFT circuit 6 and estimates a channel characteristic $H(\omega)$.

The carrier frequency is compensated by frequency error information from the synchronization circuit 5 in the channel distortion estimating circuit 7 and then the preamble 22 is used to estimate the channel characteristic $H(\omega)$.

As a result of estimation, the channel distortion estimating circuit 7 outputs a coefficient $1/H(\omega)$ for compensating channel distortion to the channel distortion compensating circuit 8.

The channel distortion compensating circuit 8 receives the signals of respective subcarriers and compensates the channel distortion by complex-multiplying the signal by the coefficient $1/H(\omega)$ for compensating the channel distortion.

Figure 3:
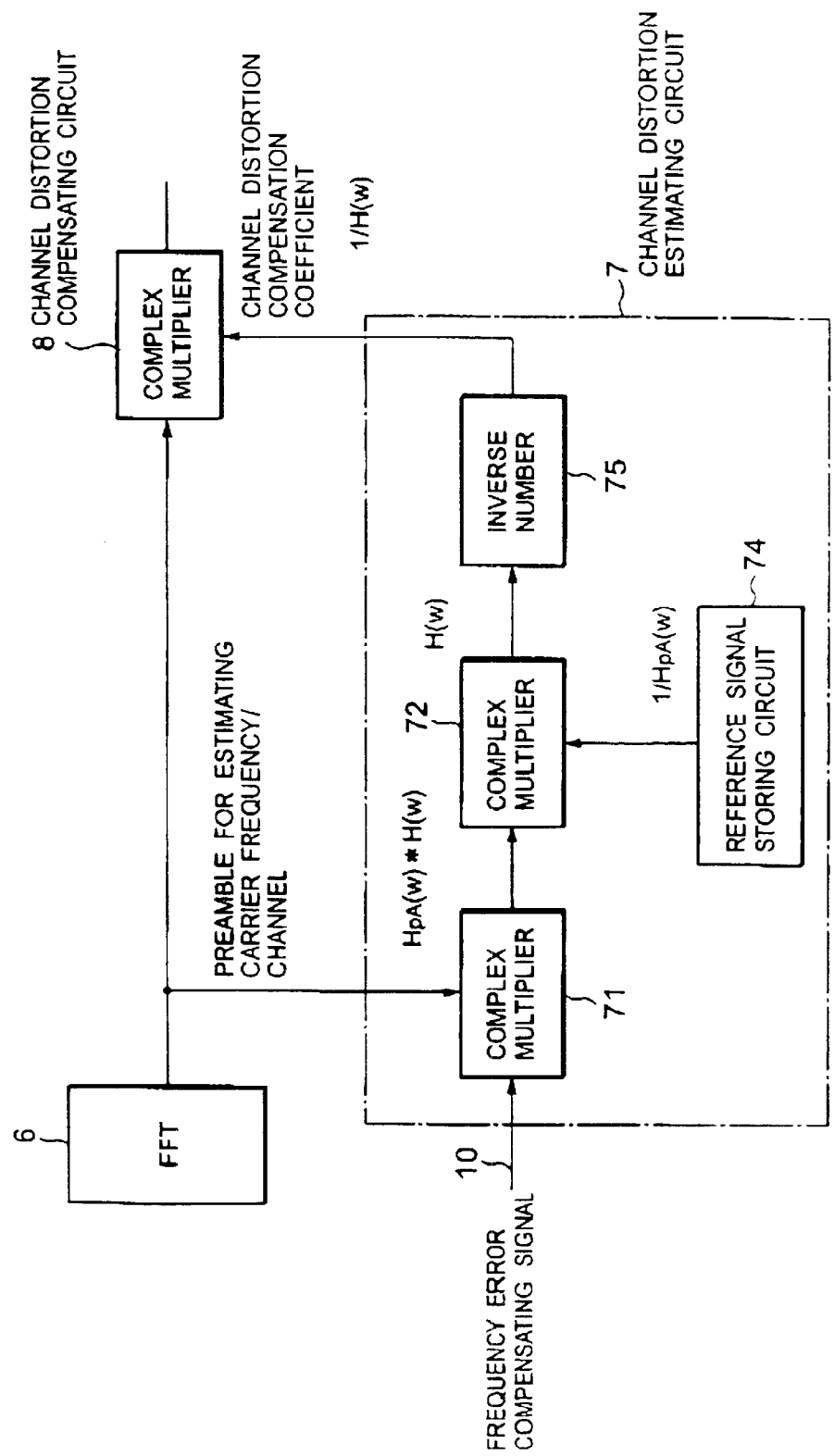
FIG. 3 is a block diagram showing the configuration of a propagation path distortion estimating circuit 7 in FIG. 1.
Figure 4:
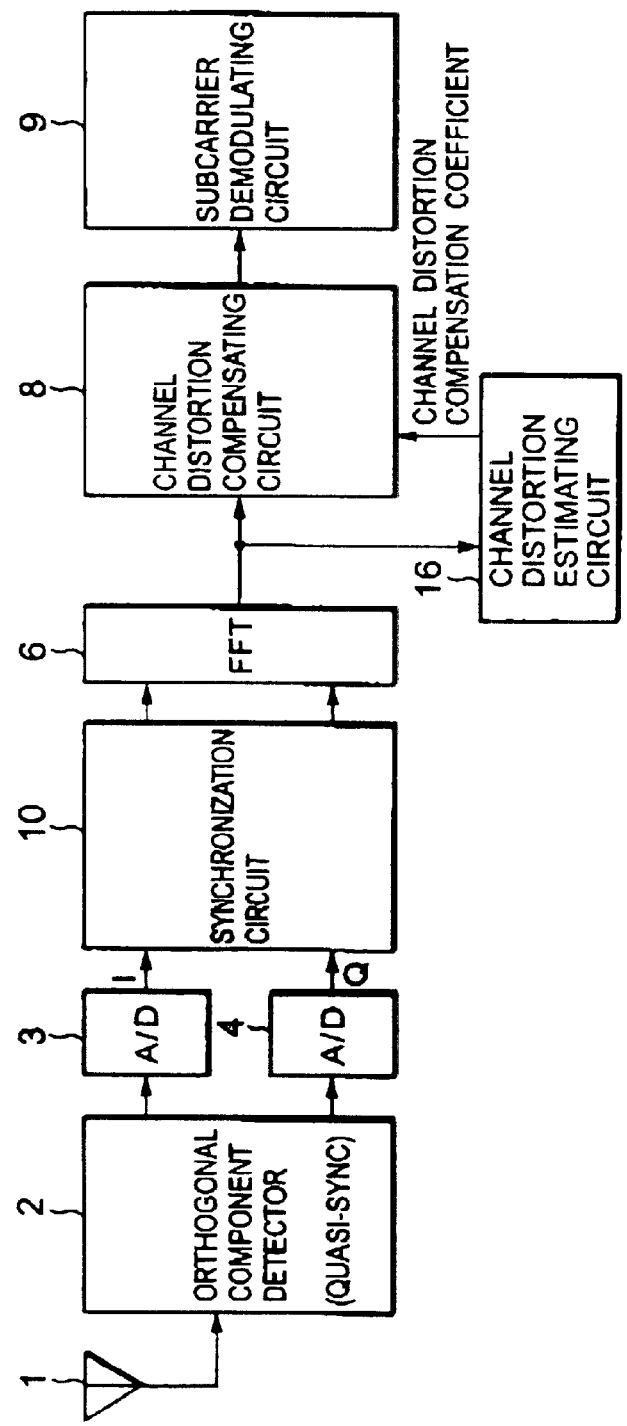
FIG. 4 is a block diagram of a conventional OFDM demodulator.

FIG. 3 is a block diagram of the channel distortion estimating circuit 7. In the diagram, the preamble signal 22 for estimating carrier frequency and channel characteristic is supplied to a complex multiplier 71 in the channel distortion estimating circuit 7. The frequency error compensation signal 10 outputted from the synchronization circuit 5 is also supplied to the complex multiplier 71. In the complex multiplier 71, phase rotation caused by a frequency error is corrected by using the frequency error information from the frequency error compensation signal 10. An output of the complex multiplier 71 is multiplied by an output of a reference signal storing circuit 74 in which the inverse number of the pattern of the preamble 22 is stored by a complex multiplier 72, thereby obtaining a channel distortion estimation result $H(\omega)$. Further, the output $H(\omega)$ of the complex multiplier 72 is supplied to an inverse number circuit 75 where a coefficient $1/H(\omega)$ for compensating the channel distortion is calculated. The channel distortion compensating coefficient $1/H(\omega)$ is multiplied by an output of the FFT 6 by the complex multiplier 8, thereby compensating the channel distortion.

The subcarrier demodulating circuit 9 receives the distortion compensating signal and demodulates it every subcarrier.

In the embodiment shown in FIG. 1, as a quasi-synchronous detection circuit, a reception signal is first subjected to orthogonal component detection and a resultant is A/D converted. Obviously, on the contrary, it is also possible to perform the A/D conversion first and execute the orthogonal component detection.

As described in detail, according to the invention, in order to shorten the processing delay time in the synchronization circuit, the compensation of the carrier frequency deviation of the preamble for estimating the carrier frequency and the channel characteristic is not performed in the synchronization circuit but is performed after the FFT.

As a result, without providing the synchronization circuit with the delay circuit unlike a conventional manner, by using the process delay of the FFT, the process delay of the synchronization circuit can be largely shortened.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An orthogonal frequency division multiplexing (OFDM) demodulator for demodulating an OFDM modulated signal, comprising:
   a quasi-synchronous detector for converting the OFDM modulated signal into a complex baseband signal of two components by quasi-synchronous detection;
   a synchronization circuit for receiving the complex baseband signal and establishing symbol synchronization;
   a fast Fourier transforming circuit (FFT) for Fourier transforming an output of the synchronization circuit into signals of respective subcarriers;
   a channel distortion estimating circuit for compensating a carrier frequency error on the basis of an output of the FFT and a frequency error compensation signal outputted from the synchronization circuit and estimating channel distortion;
   a channel distortion compensating circuit for compensating channel distortion in the output of the FFT n the basis of an output of the channel distortion estimating circuit; and
   a demodulating circuit for demodulating an output of the channel distortion compensating circuit every subcarrier,
   wherein the synchronization circuit comprises:
      means for estimating a symbol timing from the complex baseband signal;
      means for estimating a carrier frequency from the complex baseband signal and outputting a carrier frequency error compensating signal;
      means for multiplying the complex baseband signal by the carrier frequency error compensating signal; and
      means for establishing symbol synchronization with the multiplication result on the basis of the estimated symbol timing.

2. An OFDM demodulator according to claim 1, wherein the OFDM modulated signal is a burst signal in which a preamble for symbol synchronization, a preamble for estimating carrier frequency/channel characteristic, and data are sequentially arranged from the head of the OFDM modulated signal.

3. An OFDM demodulator according to claim 2, wherein the symbol synchronization is established and the carrier frequency error is compensated with respect to each of the preamble for symbol synchronization and the preamble for estimating carrier frequency/channel characteristic.

* * * * *